(12) United States Patent
Chevli

(10) Patent No.: US 7,211,130 B1
(45) Date of Patent: May 1, 2007

(54) DISPERSE DYE BLACK INK

(75) Inventor: Samit N. Chevli, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 7 days.

(21) Appl. No.: 11/280,123

(22) Filed: Nov. 16, 2005

(51) Int. Cl.
*C09D 11/02* (2006.01)
*B41J 2/01* (2006.01)

(52) U.S. Cl. .................. 106/31.27; 347/100

(58) Field of Classification Search ......... 106/31.27; 347/100
See application file for complete search history.

(56) References Cited

U.S. PATENT DOCUMENTS

| | | | |
|---|---|---|---|
| 4,689,078 A | 8/1987 | Koike et al. | |
| 4,969,951 A | 11/1990 | Koike et al. | |
| 5,593,459 A * | 1/1997 | Gamblin | 8/539 |
| 5,635,970 A | 6/1997 | Shirota et al. | |
| 5,764,261 A | 6/1998 | Koike et al. | |
| 5,888,253 A | 3/1999 | Yamamoto et al. | |
| 5,910,812 A | 6/1999 | Yamamoto et al. | |
| 6,284,004 B1 | 9/2001 | Burglin et al. | |
| 6,426,766 B1 | 7/2002 | Shirota et al. | |
| 6,723,137 B1 | 4/2004 | Hakamada et al. | |

\* cited by examiner

*Primary Examiner*—Helene Klemanski
(74) *Attorney, Agent, or Firm*—Steven C. Benjamin; Bart E. Lerman

(57) ABSTRACT

This invention pertains to an aqueous disperse dye black ink and inkjet ink set containing this disperse dye black ink. The ink and ink sets are especially suitable for printing of textiles, especially polyester and polyester blends.

18 Claims, No Drawings

DISPERSE DYE BLACK INK

FIELD OF THE INVENTION

This invention pertains to an aqueous disperse dye black ink and inkjet ink set containing this disperse dye black ink. The ink and ink sets are especially suitable for printing of textiles, especially polyester and polyester blends.

BACKGROUND OF THE INVENTION

Digital printing methods such as inkjet printing are becoming increasingly important for the printing of textiles and offer a number of potential benefits over conventional printing methods such as screen printing. Digital printing eliminates the set up expense associated with screen preparation and can potentially enable cost effective short run production. Inkjet printing furthermore allows visual effects such as tonal gradients and infinite pattern repeat sizes which can not be practically achieved with a screen printing process.

However, inkjet printing as it exists today suffers from relatively slow speed. To be competitive with screen printing even for short runs, the speed of inkjet printers needs to increase. One means for increasing speed is to develop larger "industrial" printheads having a greater number of nozzles that are compatible with aqueous ink. Such heads have recently become available from companies such as Spectra Inc. (Hanover, N.H. USA) and Hitachi Koki Imaging Solutions (Simi Valley, Calif. USA). Previously, heads of this sort were only available for solvent inks and were not suitable for jetting aqueous inks.

Printers adapted to use these aqueous compatible industrial printheads are being developed. Suitable commercially available inkjet printers designed for textile printing include, for example, DuPont® Artistri® 2020 and 3210 Textile Printers (E.I. du Pont de Nemours and Company, Wilmington, Del.), Textile Jet (Mimaki USA, Duluth, Ga.), DisplayMaker Fabrijet (MacDermid Color Span, Eden Prairie, Minn.), Amber, Zircon, and Amethyst (Stork®).

Among the colorants utilized in textile printing are disperse dyes, which have proven to be especially useful for printing on hydrophobic fibers such as polyesters, cellulose acetate, etc. The initial choice of dyes for digital printing are often suggested by those used in screen printing. However, the need for specific disperse dye systems for digital printing of textiles require multiple levels of optimizing ink properties such as jettability, stability, shelf storage, color properties, etc. The color intensity of a digitally-printed textile needs to be improved for full adoption of this printing option for textiles.

For most, if not all, of the digital ink/textile combinations, there is a significant need for a blacker black. Not only is there a need for a higher optical density black when printed at 100% coverage, but also for areas of a print the require less than 100% black coverage, such that the black remains black and does not appear to have a different color hue other than a black. For black inks made up of disperse dye colorants, low coverage black printed areas can often have undesirable shading to another color.

SUMMARY OF THE INVENTION

In one aspect, the present invention pertains to an aqueous disperse dye black inkjet ink comprising an aqueous vehicle and a black disperse dye colorant, wherein the black disperse dye colorant comprises a mixture of DB291:1, DO29 and DR177.

In another aspect, the present invention pertains to an aqueous disperse dye-based inkjet ink set comprising at least two differently colored inks, wherein:

at least one of the colored inks is the aqueous disperse dye black inkjet ink mentioned above, comprising a first aqueous vehicle and a black disperse dye colorant, wherein the black disperse dye colorant comprises a mixture of DB291:1, DO29 and DR177; and at least one of the colored inks is cyan, magenta, yellow, red or violet in color and comprises a second aqueous vehicle and a disperse dye colorant.

In one preferred embodiment, the ink set comprises at least a black ink, a cyan ink, a magenta ink and a yellow ink.

In yet another aspect, the present invention pertains to a method for ink jet printing, comprising the steps of:

(a) providing an ink jet printer that is responsive to digital data signals;

(b) loading the printer with a polyester and polyester blend fabric to be printed;

(c) loading the printer with an inkjet ink set as set forth above; and (d) printing onto the substrate using the inkjet ink set in response to the digital data signals.

Optionally (and preferably), the process further comprises the following steps:

(e) heating the printed fabric with to set the printed inks, and (f) washing the steam-treated fabric.

In still another aspect, the present invention pertains to polyester and polyester fabric article printed according the above inkjet printing method.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Inks and Ink Sets

The term "ink set" refers to all the individual inks or other fluids an inkjet printer is equipped to jet. The ink set of the present invention contains at least a black (K) ink and at least one other ink chosen from a cyan (C), magenta (M), yellow (Y), red (R) or violet (V) ink.

The inks of the present ink set are characterized by the presence of particular, specified colorants in an aqueous vehicle. The colorants are disperse dyes, which are substantially insoluble in the aqueous vehicle. These disperse dyes are dispersed by common dispersants and dispersing techniques used in the manufacture of ink jet inks, which dispersants and dispersing techniques are in general well-known to those of ordinary skill in the relevant art.

Reference to the specified dyes is made by their "C.I." designation established by Society Dyers and Colourists, Bradford, Yorkshire, UK and published in the *The Color Index*, Third Edition, 1971. Sources of these dyes are generally well known to those of ordinary skill in the relevant art.

The black ink in accordance with the present invention is a combination of three disperse dyes (DB291:1, DO29 and DR177) that, as a combination, achieve an advantageous balance of optical density and a good black color, especially when printed at lower coverages. When an L*a*b* color scale is used to measure the difference between currently available disperse dye black inks and the inventive black ink, the a* and b* values for the inventive black ink are generally closer to zero in a fixed L* plane, particularly at low coverages. The closeness of a* and b* to zero means that it is a "better" black.

In a preferred embodiment, the black disperse dye colorant (total disperse dye content) is present in the black ink in an amount of from about 0.15 wt % and about 12.0 wt %, based on the total weight of the black ink. The amount of the DB291:1 disperse dye is preferably from about 4 wt % to about 8 wt % (more preferably from about 5 wt % to about 7 wt %), the amount of the DO29 disperse dye is preferably from about 1 wt % to about 3.8 wt % (more preferably from about 1.5 wt % to about 3 wt %), and the amount of the DR177 is preferably from about 1.5 wt % to about 4.5 wt % (more preferably from about 2.2 wt % to about 3.7 wt %), based on the total weight of the ink.

The disperse dye cyan ink, when present, preferably comprises an aqueous vehicle and a cyan disperse dye colorant selected from the group consisting of DB27, DB60, DB73, DB77, DB77:1, DB87, DB257, DB367 and mixtures thereof.

The disperse dye magenta ink, when present, preferably comprises an aqueous vehicle and a magenta disperse dye colorant selected from the group consisting of DR5, DR75, DR76, DR86, DR91, DR92, DR121, DR127, DR132, DR145, DR159, DR164, DR179, DR184, DR189, and DR191 and mixtures thereof.

The disperse dye yellow ink, when present, preferably comprises an aqueous vehicle and a yellow disperse dye colorant selected from the group consisting of DY5, DY27, DY33, DY42, DY50, DY59, DY79, DY83, DY98, DY100, DY114, DY122, DY139, DY140, DY160, DY199, DY201, DY204, DY206, DY224, DY231 and mixtures thereof.

The disperse dye red ink, when present, preferably comprises an aqueous vehicle and a red disperse dye colorant selected from the group consisting of DR177, DR229 and DR258 and mixtures thereof.

The disperse dye violet ink, when present, preferably comprises an aqueous vehicle and a violet disperse dye colorant selected from the group consisting of DV37, DV57, DV63 and DV99 and mixtures thereof.

In addition to the black ink in combination with the one or more of CMYRV inks as defined above, the ink sets in accordance with the present invention may contain differently colored disperse dye inks, as well as different strength versions of the CMYRVK and other inks.

As with the black and CMYRV inks, any differently colored inks preferably comprise an appropriately colored disperse dye colorant (one disperse dye or a combination of disperse dyes that result in the appropriate color) in an aqueous vehicle. The additional inks can be selected in any combination.

The inks sets of the present invention can comprise full-strength versions of the CMYRVK and other colored inks, and "light" versions of one or any combination thereof (typically denoted by lower-case such as "k", "c", "m", "y", "r" and "v").

In one preferred embodiment, the ink set comprises a black, cyan, magenta, yellow, red, violet, light magenta and light cyan ink.

Vehicle

The vehicle is a carrier for the colorant. An "aqueous vehicle" refers to a vehicle comprised of water or a mixture of water and at least one water-soluble organic solvent (co-solvent). Selection of a suitable mixture depends on requirements of the specific application, such as desired surface tension and viscosity, the selected colorant, and compatibility with substrate onto which the ink will be printed.

Examples of water-soluble organic solvents include alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether.

An aqueous vehicle will typically contain about 30% to about 95% water with the balance (i.e., about 70% to about 5%) being the water-soluble solvent.

Additives

Other ingredients, additives, may be formulated into the inkjet ink, to the extent that such other ingredients do not interfere with the stability and jettability of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or non-ionic. Useful classes of polymer additives include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.8 wt %, and more typically from about 80 wt % to about 99 wt %. Colorant is generally present in amounts up to about 15 wt %. For flag and banner applications, the colorant is typically in the range of from about 3 wt % to about 12 wt %. Percentages are weight percent of the total weight of ink.

Other ingredients (additives), when present, generally comprise less than about 15 wt %, based on the total weight of the ink. Surfactants, when added, are generally in the range of from about 0.2 wt % to about 3 wt %, based on the total weight of the ink. Polymers can be added as needed, but will generally be less than about 15 wt %, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Substrate

The instant ink set is especially advantageous for printing a substrate that is synthetic polyester and/or polyester blends fabric. An example of a polyester fabric is a 600 Denier polyester from Pacific Coast Fabrics, Gardena, Calif.

These types of fabric are commonly pretreated prior to printing. Suitable pretreatments for such fabrics are in general well known to those of ordinary skill in the relevant art, and application of the pretreatment to the fabric can be any convenient method, such methods also being generally well known to those of ordinary skill in the relevant art.

One example of a preferred pretreatment application method is referred to as padding. In padding, a fabric is dipped in the pretreatment solution, then the saturated fabric is passed through nip rollers that squeeze out the excess solution. The amount of solution retained in the fabric can be regulated by the nip pressure applied by the rollers. Other pretreatment techniques include spray application wherein the solution is applied by spraying on the face or face and back of the fabric. The wet pick-up of pretreatment solution is preferably from about 20 and about 100% wet pick-up, more preferably from about 75 to about 85% wet pick-up.

After application of pretreatment, the fabric is typically dried in any convenient manner, generally at a temperature of less than 100° C., until the fabric is dry. The final percent moisture is (approximately) equal to the equilibrium moisture of the pretreated fabric at ambient temperature, and can vary somewhat depending on the relative humidity of the surrounding air.

The resins remaining in the fabric after drying provide the absorbent layer for the inkjet inks during printing. It will be appreciated that sufficient resin must be present to absorb the ink load applied. On the other hand, the presence of too much resin may prevent proper penetration. Routine optimization will reveal appropriate coating levels for a given printer and ink set.

The pre-treated fabric should be kept clean, dry and below 50% relative humidity prior to printing.

Printing Method

Printing can be accomplished by any inkjet printer equipped for handling and printing fabric. Commercial printers include, for example, the Dupont™ Artistri™ 3210 and 2020 printers, and the Mimaki TX series of printers.

The amount of ink laid down on the fabric can vary by printer model, by print mode (resolution) within a given printer and by the percent coverage need to achieve a given color. The combined effect of all these considerations is grams of ink per unit area of fabric for each color. In one embodiment, ink coverage is preferably from about 5 to about 17 grams of ink per square meter of fabric. There is a balance between the ink density needed to achieve a desired color and the absorption capacity of the coating resins in the pretreatment.

The digitally printed fabric will typically be post-treated according to procedures well known in the textile art. Preferably, the digitally printed fabric should be stored at 25° C. and less than 50% relative humidity (but for no more than 3 days) prior to fixation.

Preferably the fixation can be done by either thermofix (dry heat fix) at 200° C. (392° F.) for 60 seconds (done in tenter frame or stenter), pressure steam fix at 140° C. (284° F.) for 25 minutes (recommended for textured yarn), or superheated steam fix at 170–180° C. (338° F.–356° F.) for 7–10 minutes (recommended for textured yarn).

After the fixation, the preferable wash-off utilizes the following steps:

(1) rinse in cold water for 10–15 minutes; and (2) fill bath at 70° C. (158° F.) and reduction clear (remove excess dye) for 10–15 minutes using 1 gram per liter NaOH (sodium hydroxide), 2 grams per liter $Na_2S_2O_4$ (sodium hydrosulfite) and 1 gram per liter anionic surfactant.

Any anionic surfactant recommended for washing of disperse dyes on polyester can be used.

EXAMPLES

Preparation of Dispersant Polymer

A 12-liter flask was equipped with a mechanical stirrer, thermometer, $N_2$ inlet, drying tube outlet, and addition funnels. Tetrahydrofuran (THF, 3750 gm) and p-xylene (7.4 gm) were charged to the flask. A catalyst (tetrabutyl ammonium m-chlorobenzoate, 3.0 ml of a 1.0 M solution in acetonitrile) was then added. Initiator (1,1-bis(trimethylsiloxy)-2-methyl propene, 291.1 gm (1.25 moles)) was injected. Feed I (tetrabutyl ammonium m-chlorobenzoate, 3.0 ml of a 1.0 M solution in acetonitrile) was started and added over 180 minutes. Feed II (trimethylsilyl methacrylate, 1975 gm (12.5 moles)) was started at 0.0 minutes and added over 35 minutes. One hundred minutes after Feed II was completed (over 99% of the monomers had reacted), Feed III (benzyl methacrylate, 2860 gm (16.3 moles)) was started and added over 30 minutes.

At 400 minutes, 720 gm of methanol was added to the above solution and distillation begun. During the first stage of distillation, 1764.0 gm of material was removed. Then more methanol (304.0 gm) was added and an additional 2255.0 gm of material was distilled out. The remaining polymer solution was 49.7 wt % solids.

2-pyrrolidone (2-P) was then added to obtain a 40 wt % solution of the block copolymer with 55 wt % 2-P The block copolymer had a composition of BZMA//MAA 13//10, with a molecular weight (Mn) of 3,200 and an acid value of 3.52.

Preparation of Disperse Dye Dispersion 12.5 parts by weight of the dispersant solution of the 13//10 block copolymer was added to 25 parts by weight of dye and water to make up 77 parts by weight. The block copolymer was neutralized with N,N-dimethylethanolamine, and this was mixed with a high-speed dispersion blade type mixer until a uniform, fluid mixture was obtained. An additional 6 parts by weight water was then added.

This dye dispersion was processed in a bead mill until the mean particle size of 0.05 to 0.2 microns was obtained. This was let down with about 17 parts by weight water to obtain a dye dispersion with 25 wt % dye solids and 5 wt % dispersant solids.

For the inventive disperse dye black ink, the component disperse dyes were separately prepared as dispersions and the three disperse dye dispersions were combined to produce the black ink.

Inks were prepared according to the formulations in the following tables wherein amounts are ink weight percent of the total weight of ink. The dispersion of the dye was added to the other ink components to prepare the inks. Colorants were "inkjet grade" meaning that they were relatively pure and free of excessive amounts of salts. The colorants were used as received or further purified by common techniques for disperse dyes such that sufficient purity was obtained for application in inkjet printing. In each case the dispersed dye/dispersant ratio was 5. N,N-dimethylethanolamine was used to adjust pH. Surfynol® 440 is a surfactant from Air Products Corp (Allentown, Pa., USA). Proxel™ GXL is a Biocide from Avecia (Wilmington, Del., USA). Dowanol® DPM was obtained from Dow Chemical (Midland Mich.).

An Inventive Black Ink and a Comparative Black Ink were each prepared according to the composition listed in Table 1 and printed on polyester fabric using a DuPont™ Artistri™ 2020 printer. Tests were conducted with a polyester from Pacific Coast Fabrics (Gardenia Calif.) that had been pretreated in a manner as generally described above. Blocks of different area fill were printed. After printing, the blocks were autoclaved at 120° C./60 minutes, reduction cleared at 70° C./10 minutes, and washed. After post treatment, the prints all showed good color and good penetration. The different area fill blocks were measured with a Spectrolino Instrument made by Gretag Macbeth (New Windsor, N.Y.). The results are shown in Table 2.

TABLE 1

Disperse Dye Ink Examples

| (all weights as weight %) | Inventive Black | Comparative Black |
|---|---|---|
| Ethylene Glycol | 23.0 | 23.0 |
| Glycerol | 8.0 | 8.0 |
| LEG-1 | 4.0 | 4.0 |
| Dowanol ® DPM | 5.0 | 5.0 |
| Surfynol ® 440 | 1.0 | 1.0 |
| Proxel ™ GXL | 0.15 | 0.15 |
| 2-Pyrrolidone | 0.72 | 0.72 |
| Disperse Dye in Dispersion (wt % dye) | Footnote 1 | Footnote 2 |
| Water | Bal. to 100% | Bal. to 100% |
| Properties | | |
| pH | 8.5 | 8.5 |
| Viscosity (cps, 25° C.) | 8.1 | 8.1 |
| Surface Tension (dyne/cm at 25° C.) | 30.0 | 31.3 |

Footnote 1—Inventive Black dye was a combination of DR177 (3.0 wt %), DO29 (2.3 wt %) and DB291:1 (5.7 wt %).
Footnote 2—Comparative Black dye was a combination of DV63 (1.5 wt %), DO29 (3.5 wt %) and DB291:1 (5.0 wt %).

TABLE 2

L*a*b* Area Fill Measurements for Inventive and Comparative Black

| INK | % Area Fill | L* | a* | b* | C* | h |
|---|---|---|---|---|---|---|
| Unprinted Fabric | 0.0 | 93.9 | 0.3 | −5.0 | 5.0 | 273.4 |
| Inventive Black | 2.0 | 74.1 | −1.7 | −7.7 | 7.9 | 257.8 |
| Inventive Black | 4.3 | 60.1 | −2.1 | −8.5 | 8.7 | 256.1 |
| Inventive Black | 10.2 | 39.4 | −1.6 | −8.1 | 8.3 | 258.9 |
| Inventive Black | 22.0 | 25.7 | −0.2 | −5.5 | 5.5 | 267.5 |
| Inventive Black | 47.1 | 18.4 | 0.6 | −2.8 | 2.8 | 281.7 |
| Inventive Black | 77.6 | 18.2 | 0.8 | −1.8 | 2.0 | 292.5 |
| Inventive Black | 100.0 | 17.7 | 0.8 | −1.7 | 1.9 | 295.0 |
| Comp. Black | 2.0 | 73.9 | −1.5 | −9.3 | 9.5 | 260.7 |
| Comp. Black | 4.3 | 59.0 | −2.4 | −10.8 | 11.1 | 257.4 |
| Comp. Black | 10.2 | 39.8 | −2.8 | −10.4 | 10.8 | 254.8 |
| Comp. Black | 22.0 | 24.4 | −1.9 | −7.3 | 7.6 | 255.2 |
| Comp. Black | 47.1 | 19.8 | −0.3 | −3.6 | 3.6 | 264.9 |
| Comp. Black | 77.6 | 18.9 | 0.0 | −2.4 | 2.4 | 271.0 |
| Comp. Black | 100.0 | 17.6 | 0.0 | −2.4 | 2.4 | 269.5 |

As can be seen from the results, the measured area fill (the a* and b*) was generally lower for the Inventive Black Ink, especially in the lower % area fill blocks.

The invention claimed is:

1. An aqueous disperse dye black inkjet ink comprises a first aqueous vehicle and a black disperse dye colorant, wherein the black disperse dye colorant comprises a mixture of DB291:1, DO29 and DR177.

2. The aqueous disperse dye black ink of claim 1, comprising from about 70 wt % to about 99.8 wt % aqueous vehicle, and from about 0.15 wt % to about 15 wt % disperse dye colorant, based on the total weight of the ink.

3. The aqueous disperse dye black ink of claim 2, wherein the black disperse dye colorant is present in an amount of from about 0.15 wt % and about 12.0 wt %, based on the total weight of the black ink.

4. The aqueous disperse dye black ink of claim 1, wherein the DB291:1 is present in an amount of from about 4 wt % to about 8 wt %, the DO29 is present in an amount of from about 1 wt % to about 3.8 wt %, and the DR177 is present in an amount of from about 1.5 wt % to about 4.5 wt %, based on the total weight of the ink.

5. The aqueous disperse dye black ink of claim 1, wherein the DB291:1 is present in an amount of from about 5 wt % to about 7 wt %, the DO29 is present in an amount of from about 1.5 wt % to about 3.0 wt %, and the DR177 is present in an amount of from about 2.2 wt % to about 3.7 wt %, based on the total weight of the ink.

6. The aqueous disperse dye black ink of claim 1, having a surface tension in the range of about 20 dyne/cm to about 70 dyne/cm at 25° C., and a viscosity of 30 cP or less at 25° C.

7. An aqueous disperse dye-based inkjet ink set comprising at least two differently colored inks, wherein:
   at least one of the colored inks is an aqueous disperse dye black inkjet ink comprising a first aqueous vehicle and a black disperse dye colorant, wherein the black disperse dye colorant comprises a mixture of DB291:1, DO29 and DR177; and
   at least one of the colored inks is cyan, magenta, yellow, red or violet in color, and comprises a second aqueous vehicle and a disperse dye colorant.

8. The inkjet ink set of claim 7, wherein the inks each comprise from about 70 wt % to about 99.8 wt % aqueous vehicle.

9. The inkjet ink set of claim 7, wherein the inks each have a surface tension in the range of about 20 dyne/cm to about 70 dyne/cm at 25° C., and a viscosity of 30 cP or less at 25° C.

10. The inkjet ink set of claim 7, wherein each of the inks contains from about 0.15 wt % to about 15 wt % disperse dye colorant, based on the total weight of the ink.

11. The inkjet ink set of claim 7, wherein the black disperse dye colorant is present in the disperse dye black ink in an amount of from about 0.15 wt % and about 12.0 wt %, based on the total weight of the black ink.

12. The inkjet ink set of claim 7, wherein the aqueous disperse dye black ink comprises DB291:1 in an amount of from about 4 wt % to about 8 wt %, DO29 in an amount of from about 1 wt % to about 3.8 wt %, and DR177 in an amount of from about 1.5 wt % to about 4.5 wt %, based on the total weight of the ink.

13. The inkjet ink set of claim 7, comprising the black ink, a cyan ink, a magenta ink, a yellow ink, a violet ink, a red ink, a light magenta ink and a light cyan ink.

14. The inkjet ink set of claim 7, wherein:
   the cyan ink, when present, comprises an aqueous vehicle and a cyan disperse dye colorant selected from the group consisting of DB27, DB60, DB73, DB77, DB77:1, DB87, DB257, DB367 and mixtures thereof;
   the magenta ink, when present, comprises an aqueous vehicle and a magenta disperse dye colorant selected from the group consisting of DR5, DR75, DR76, DR86, DR91, DR92, DR121, DR127, DR132, DR145, DR159, DR164, DR179, DR184, DR189, and DR191 and mixtures thereof;
   the yellow ink, when present, comprises an aqueous vehicle and a yellow disperse dye colorant selected from the group consisting of DY5, DY27, DY33, DY42, DY50, DY59, DY79, DY83, DY98, DY100, DY114, DY122, DY139, DY140, DY160, DY199, DY201, DY204, DY206, DY224, DY231 and mixtures thereof;
   the red ink, when present, comprises an aqueous vehicle and a red disperse dye colorant selected from the group consisting of DR177, DR229 and DR258 and mixtures thereof; and
   the violet ink, when present, comprises an aqueous vehicle and a violet disperse dye colorant selected from the group consisting of DV37, DV57, DV63 and DV99 and mixtures thereof.

15. A method for ink jet printing onto a fabric substrate, comprising the steps of:
   (a) providing an ink jet printer that is responsive to digital data signals;
   (b) loading the printer with a fabric substrate to be printed;
   (c) loading the printer with an inkjet ink; and
   (d) printing a print onto the fabric substrate using the inkjet ink in response to the digital data signals,
wherein the inkjet ink is an aqueous disperse dye black inkjet ink comprises a first aqueous vehicle and a black disperse dye colorant, wherein the black disperse dye colorant comprises a mixture of DB291:1, DO29 and DR177.

16. The method of claim 15, further comprising the steps of:
   (e) fixing the disperse dye inks, and
   (f) washing the digitally printed fabric.

17. The method of claim 15, wherein the substrate is a polyester or polyester blend.

18. The method of claim 15, wherein the printer is loaded with an inkjet ink set, and the fabric substrate is printed using the inkjet ink set in response to the digital data signals, wherein:
   the inkjet ink set comprises at least two differently colored inks,
   at least one of the colored inks is the black ink, and
   at least one of the colored inks is cyan, magenta, yellow, red or violet in color, and comprises a second aqueous vehicle and a disperse dye colorant.

* * * * *